3,009,876
LUBRICANT COMPOSITION
John M. Nielsen, Schenectady, N.Y., assignor to General Electric Company, a corporation of New York
No Drawing. Filed Sept. 28, 1959, Ser. No. 842,553
6 Claims. (Cl. 252—37.2)

This invention relates to an organopolysiloxane lubricant composition and to its preparation. More particularly this invention relates to a stabilized high temperature organopolysiloxane fluid which is useful as a lubricant and hydraulic fluid and which is prepared from a stabilizer concentrate solution.

Heretofore silicone fluids of various types have been known in the art and have found extensive use as hydraulic fluids and lubricants where service at temperatures above the conventional operating temperatures of hydrocarbon fluids has been required. The most common of these silicone materials are the methyl silicone fluids such as described in Patent 2,469,888, Patnode. While the fluids of the aforementioned Patnode patent are satisfactory in many applications, they have been found somewhat deficient when extended use in contact with air at elevated temperatures, such as temperatures of the order of 225 to 300° C., has been required. At these temperatures there is the tendency for these methyl silicone fluids to gel after extended use. Another disadvantage of the methyl silicone fluids of the Patnode patent has been the lack of good lubricity particularly in systems where extreme pressure lubricating characteristics have been required.

In order to obviate the shortcomings of these methyl silicone fluids, organopolysiloxane fluids have been prepared which contain both silicon bonded lower alkyl radicals and silicon bonded polychlorophenyl radicals. These alkyl chlorophenyl silicones have been stable in air at temperatures higher than the conventional methyl silicone fluids and have had a much higher lubricity than the conventional methyl silicone fluids. Thus where temperatures higher than the usual operating temperatures of methyl silicone fluids have been required, particularly in environments where lubricity has been required, alkyl chlorophenyl fluids have been employed instead of methyl phenyl fluids.

While these alkyl chlorophenyl fluids represent a marked improvement, the fluids have still been subject to several defects. While the lubricity of the alkyl chlorophenyl fluids has been very satisfactory it has been found that there is still a tendency for the alkyl chlorophenyl fluid to gel on prolonged exposure to air at temperatures of the order of 225 to 300° C. One method of improving the stability of these alkyl chlorophenyl fluids has been by incorporating therein some of the metal salts of organic carboxylic acids as disclosed in Patent 2,445,567, Elliott. In particular, the most useful of these additives has been iron octoate and in fact commercial iron octoate-containing methylchlorophenyl fluids have been used successfully in a number of applications. While the presence of the iron octoate in alkyl chlorophenyl fluids, such as methylchlorophenyl fluids, has substantially improved the oxidative stability and fluid life before gelation upon extended use at temperatures of 225 to 300° C., it has been found that the presence of the iron octoate in the methylchlorophenyl fluid causes the formation of a haze or a sludge in the fluid. This haze or sludge is, of course, undesirable and is particularly bad when the iron octoate-stabilized alkyl chlorophenyl fluids have been used in systems where lubricity has been required, since the sludge interferes with the lubricating action of the fluid and also interferes with the flow of the fluid in hydraulic systems.

The present invention is based on my discovery that an improved, stabilized alkyl chlorophenyl silicone fluid can be prepared by first forming a concentrate of iron octoate in the alkyl chlorophenyl fluid, then oxidizing the resulting mixture at the temperature at which the fluid is designed to operate by passing an oxygen containing gas through the mixture, thereafter cooling the aerated fluid to room temperature and filtering the resulting precipitate-containing material to produce a filtrate which serves as a concentrate. This concentrate is then added to additional amounts of alkyl chlorophenyl silicone fluids and results in fluids which are resistant to gelation at temperatures of the order of 225 to 300° C. for extended periods of time without the formation of any haze or sludge in the fluid during its operating life.

The alkyl chlorophenyl organopolysiloxane fluids employed in the practice of the present invention have the formula:

$$(R)_n SiO_{\frac{4-n}{2}}$$

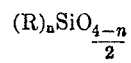

where R represents both a lower alkyl radical, e.g., an alkyl radical containing from 1 to 7 carbon atoms, such as, methyl, ethyl, butyl, hexyl, etc. radicals, and chlorinated phenyl radicals in which the chlorinated phenyl radicals contain an average of from 3 to 5 chlorine atoms per phenyl nucleus, and the chlorinated phenyl radicals constitute from 1 to 7 percent of the total number of alkyl and chlorophenyl radicals, and $n$ has an average value of from about 2.01 to 2.5, the lower alkyl chlorophenyl-polysiloxane fluid having a viscosity of from about 10 to 100,000 centistokes, e.g., from 15 to 5,000 centistokes, when measured at 25° C. These alkyl chlorophenyl silicones are preferably methyl chlorophenyl silicones and may be prepared by various methods. One method for preparing these compositions comprises cohydrolyzing, in the proper proportions, trimethylchlorosilane, dimethyldichlorosilane (or diethyldichlorosilane), and chlorinated phenyltrichlorosilane. Thus, on a weight basis, I can employ from 1 to 9 percent trimethylchlorosilane, from 75 to 95 percent dimethyldichlorosilane, and from 3 to 15 percent chlorinated phenyltrichlorosilane. Alternatively, one can use mixtures of hydrolyzable silanes in which the chlorophenyl group is attached to a silicon atom which also has a methyl or ethyl or other lower alkyl group directly attached thereto, for instance, methyltrichlorophenyldichlorosilane, methyltetrachlorophenyldichlorosilane, methyltetrachlorophenyldiethoxysilane, ethyltetrachlorophenyldichlorosilane, etc. Higher chlorinated phenylchlorosilanes or other hydrolyzable silanes such as pentachlorophenyltrichlorosilane, can be used without departing from the scope of the invention. The presence of certain triorganosiloxane units, such as trimethylsiloxane units, or mono-organosiloxane units, such as methylsiloxane units, is not precluded. The proportions of the hydrolyzable ingredients should be such in making the lower alkyl chlorophenylpolysiloxane that the ratio of the lower alkyl groups and chlorinated phenyl radicals to silicon atoms ranges from about 2.01 to about 2.5, the chlorinated phenyl radicals constituting from 1 to 7 percent of the total number of alkyl and chlorophenyl radicals. Preferably the lower alkyl chlorophenyl-siloxane fluid should have a viscosity of from about 30 to 1,000 centistokes when measured at 25° C.

It will of course be apparent to those skilled in the art that in addition to the methylchlorosilanes and ethyl-chlorosilanes described above for use in the preparation of alkylchlorophenylpolysiloxane, other hydrolyzable lower alkyl silanes containing hydrolyzable groups other than the chlorine atom may be used. The presence of, for instance, methyltrichlorosilane or other lower alkyl trihydrolyzable silanes, or of trimethylchlorosilane or other tri-substituted lower alkyl monochlorosilanes in preparing the lower alkylchlorophenylpolysiloxane is not precluded, as long as the value of $n$ remains substantially within the range specified above.

As previously mentioned the alkylchlorophenylpolysiloxane fluids are stabilized by adding thereto a "concentrate" which consists of the product obtained by mixing an alkyl chlorophenyl silicone fluid with an iron salt of an organic carboxylic acid and passing an oxygen containing gas through the mixture at the temperature at which the alkylchlorophenylpolysiloxane fluid is to be used. Among the many iron salts of organic carboxylic acids which can be employed in the practice of the present invention are both aliphatic and aromatic acids, for example, the iron salts of saturated aliphatic acids, e.g. iron acetate, iron propionate, iron butyrate, iron isobutyrate, iron n-hexoate, iron 2-ethyl hexoate, etc., especially the iron salts of branched-chain saturated aliphatic carboxylic acids containing from about 4 to 14 carbon atoms, which salts are more soluble in the alkylchlorophenylpolysiloxane than the straight chain derivatives; iron salts of the aromatic acids, e.g., iron benzoate, iron naphthanoate, iron toluate, etc.; iron salts of cyclic acids, e.g. iron cyclohexanecarboxylate, etc.; iron salts of saturated and unsaturated aliphatic and aromatic polycarboxylic acids, e.g., iron oxalate, iron succinate, iron adipate, iron maleate, iron phthalate, etc.; iron rosinate, etc.; and iron salts of organic crude acids, which salts are often employed as driers for paints. While a broad spectrum of iron salts of organic carboxylic acids are useful in the practice in the process of the present invention, the preferred iron salt is iron octoate (2-ethylhexoate). The iron salt can be employed in the pure form when such form is available and can also be employed in the form of a solution or paste in an inert solvent. For example, when employing iron octoate it is preferred to employ the iron in one of its commercially available forms such as a 6 percent by weight solution of iron as iron octoate in mineral spirits or a 15 percent iron by weight paste formed by mixing mineral spirits with iron octoate. In beginning the preparation of the concentrate of the present invention the iron salt is merely added to the alkylchlorophenylpolysiloxane in the required amount and the mixture or suspension is stirred to form as homogeneous a mixture as possible. The amount of the iron salt which is added to the polysiloxane can vary within wide limits. However, optimum results are obtained when from 0.1 to 2.5 parts, by weight, of iron as the iron salt per 100 parts of the lower alkylchlorophenylpolysiloxane are employed. The preferred concentration of the iron is from 0.3 to 1.5 parts, by weight, of the iron as the iron salt per 100 parts of the polysiloxane fluid.

After mixing the iron salt into the lower alkyl-chlorophenylpolysiloxane and forming as homogeneous a mixture as possible the mixture is heated to the temperature at which it is desired to operate the fluid to which the concentrate is added or to a higher temperature, such as a temperature up to 320° C. Since the primary utility of lower alkylchlorophenylpolysiloxane fluids is in operations in air at temperatures of from about 225 to 300° C., it is preferred to heat the concentrate to this temperature range. While this concentrate mixture is being heated to the ultimate temperature or after the concentrate reaches the ultimate temperature the concentrate is "aerated" by bubbling therethrough an oxygen-containing gas. Preferably the oxygen is bubbled through the concentrate in the form of air since this is obviously the most convenient method of supplying oxygen to the concentrate. It will be apparent to those skilled in the art, however, that other inert gases besides nitrogen can be employed, for example, helium, argon, zenon, etc. Where an oxygen-containing gas other than air is employed, the oxygen is preferably present in an amount equal to from 5 to 40 percent by volume. The time required for the aeration of the concentrate is relatively short, with the aeration usually being accomplished by first heating the concentrate to a temperature of about 100° C. and then beginning the bubbling of air into the concentrate while the concentrate is heated to the aforementioned temperature in the range of from 225 to 300° C. In practice, this heating step usually takes a minimum of about 5 minutes and therefore under usual operating conditions the aeration is carried out for the 5 minute period while the concentrate is being heated from 100° C. to, for example, 300° C. Aeration can be continued while the fluid is maintained at this temperature, can be discontinued at this time, or can be continued while the fluid is cooled to room temperature. No particular disadvantage is observed from aerating the material for times much longer than the 5 minute period mentioned above and the satisfactory results have been obtained employing times of up to 2 to 3 hours or more for the aeration step. The amount of air employed during the aeration is not critical it being necessary only to provide sufficient air to insure thorough aeration of the fluid, i.e., thorough mixing of the air and the fluid while it is being heated to the elevated temperature or after it is heated to the elevated temperature.

During the aeration the solvent, such as mineral spirits, which may have been present in or together with the iron octoate is volatilized from the concentrate and at the same time the aeration causes the formation of a flocculent precipitate or sludge in the concentrate. After the aeration is completed the concentrate is cooled to some temperature below the aeration temperature, such as the temperature of from 25 to 100° C., and the precipitate is filtered from the reaction mixture, resulting in a homogeneous concentrate. This concentrate is then added to additional lower alkylchlorophenylpolysiloxane fluid to form the stabilized fluid of the present invention.

The addition of the concentrate to the alkylchlorophenylpolysiloxane fluid is accomplished in a conventional manner by merely mixing the concentrate with the alkylchlorophenylpolysiloxane fluid in the desired amount. While the amount of concentrate employed varies depending on the desired results it has been found that satisfactory stabilization of lower alkylchlorophenylpolysiloxane fluids is obtained when using from 0.5 to 10 parts, by weight, and preferably from 1.5 to 6.5 parts, by weight, of the concentrate per 100 parts of the lower alkylchlorophenylpolysiloxane fluid. Regardless of the amount of concentrate, within the range described above, which is added to the alkylchlorophenylpolysiloxane fluid it is found that the resulting "stabilized" fluid does not show any haziness or form any sludge during extended operation at temperatures in the order of 225 to 300° C. On the other hand the stability of the alkylchlorophenylpolysiloxane fluid generally improves as the amount of concentrate added is increased. With relatively large amounts of concentrate within the above range, a "stabilized" fluid is formed which does not gel under rigorous conditions of use. As the amount of concentrate is decreased, the gelation time of the fluid is also generally decreased. However, even the use of as low as 0.5 percent of the concentrate in a fluid results in a stability which is far superior to the stability found in the fluid without any concentrate. Furthermore the presence of the concentrate results in a fluid which remains homogeneous and which does not form any sludge during use, in contrast to the haze and sludge which is often found even at room temperature when commercial iron octoate per se is added to an alkylchlorophenylpolysiloxane fluid.

The following examples are illustrative of the practice of my invention and are not intended for purposes of limitation. All parts are by weight.

*Example 1*

This example describes the preparation of a concentrate within the scope of my invention and the use of this concentrate at two different levels in the stabilization of a methylchlorophenyl silicone fluid. The methylchlorophenylpolysiloxane fluid employed in this example contained an average of 2.22 methyl groups per silicon atom and 0.03 chlorophenyl group per silicon atom with each phenyl group containing an average of about 4 chlorine atoms. This fluid had a viscosity at 25° C. of about 70 centistokes. To 100 parts of this fluid was added 0.38 part of iron in the form of a 15 percent paste of iron, as the octoate, and mineral spirits. Air was bubbled rapidly through this mixture while the temperature was raised to 280° C. over a period of about 90 minutes. Bubbling of air was continued while the mixture was cooled to about 200° C. and then discontinued while the mixture was cooled to room temperature. The precipitate was filtered from this aerated material and the filtrate constituted the concentrate of the present invention. To evaluate the effectiveness of this concentrate in stabilizing a methylchlorophenyl silicone fluid a control sample of the fluid mentioned above was heated at 260° C. while air was bubbled therethrough at a controlled rate to determine the time required for the viscosity of the fluid to double, which is a measure of the stability of the fluid. It was found that the viscosity of the fluid doubled in approximately 21 hours. To another portion of the fluid was added 1.1 parts of the concentrate per 100 parts of the fluid and the viscosity doubling time was again determined and found to be about 54 hours. To a third portion of the fluid was added 1.8 parts of the concentrate per 100 parts of the fluid and the viscosity doubling time was found to be about 76 hours, indicating that the presence of the concentrate greatly enhanced the stability of the methylchlorophenyl silicone fluid. To a fourth portion of the fluid was added 10 parts of a similar concentrate per 100 parts of the fluid and the viscosity doubling time was found to be about 70 hours. During the viscosity doubling period no haze or sludge formed in any of the stabilized fluids described above.

*Example 2*

To 100 parts of the methylchlorophenylpolysiloxane fluid described in Example 1 was added 0.75 part of iron as a 15 percent iron-containing iron octoate paste in mineral spirits and the resulting mixture was heated to a temperature of 280° C. over a 2.5 hour period during which time air was bubbled rapidly into the reaction mixture. At the end of this time the reaction mixture was allowed to cool to room temperature and the precipitate which formed was filtered from the reaction mixture resulting in a homogeneous filtrate which again is a concentrate within the scope of the present invention. To 100 parts of the methylchlorophenyl fluid described above was added 4.3 parts of this concentrate and the time required to double the viscosity of the fluid was measured and found to be 72 hours.

*Example 3*

Following the procedure of Examples 1 and 2 a concentrate was formed from 100 parts of the methylchlorophenyl silicone fluid of Example 1 and 1.1 parts of iron as a 15 percent iron-containing iron octoate paste in mineral spirits. When 1.8 parts of this filtered concentrate was added to 100 parts of the methylchlorophenyl silicone fluid it was found that the time required for viscosity doubling was 85 hours.

*Example 4*

To 100 parts of the methylchlorophenyl silicone fluid of Example 1 was added 1.56 parts of iron as a 6 percent iron-containing solution of iron octoate in mineral spirits. While the resulting solution was being heated to a temperature of 250° C. over a 30 minute period air was bubbled through the solution. At the end of this time the aerated solution was cooled to room temperature and later the heavy precipitate which had formed was filtered therefrom, resulting in another concentrate within the scope of my invention. To 100 parts of the methylchlorophenyl silicone fluid was added 2.5 parts of this concentrate and the viscosity doubling time of this stabilized solution at 275° C. was measured and found to be about 48 hours. To compare the sludging characteristics of this stabilized fluid with the characteristics of a fluid in which the 6 percent iron octoate solution was added without the preparation of concentrate, a sample of each of these materials was heated for 30 minutes at 260° C. At the end of this time the fluid prepared from the concentrate was clear and homogeneous. The material prepared without the concentrate, but with the commercial iron octoate solution added directly, was hazy and contained a substantial amount of sludge.

While the foregoing examples have described only a few of the many variations in the present invention it will be understood by those skilled in the art that other proportions of iron octoate than those specifically shown in the examples can be employed to prapare concentrates and stabilized lower alkyl chlorophenyl silicone fluids within the scope of my invention. In addition, other lower alkylchlorophenylpolysiloxane fluids may be employed and iron salts of other carboxylic acids than those specifically illustrated can also be employed.

The stabilized fluids prepared by the practice of my invention are extremely useful as heat transfer fluids, as hydraulic fluids, and as lubricating fluids in applications where extended service at temperatures in the range of from 225 to 300° is required.

What I claim and desire to secure by Letters Patent of the United States is:

1. The process which comprises adding an iron salt of an organic carboxylic acid to a lower alkylchlorophenylpolysiloxane fluid to form a mixture, bubbling air through said mixture while heating said mixture at an elevated temperature, and thereafter filtering the precipitate which is formed during the bubbling operation, said lower alkylchlorophenylpolysiloxane fluid having a viscosity of from about 10 to 100,000 centistokes when measured at 25° C., and containing an average of from 2.01 to 2.5 lower alkyl and chlorophenyl groups per silicon atom, from 1 to 7 percent of the lower alkyl and chlorophenyl groups being chlorophenyl groups, with there being an average of from 3 to 5 chlorine atoms attached to each phenyl group.

2. The process which comprises (1) adding from 0.1 to 2.5 parts by weight of iron, as iron octoate, to 100 parts by weight of a methylchlorophenylpolysiloxane fluid having a viscosity of from about 10 to 100,000 centistokes when measured at 25° C. and containing an average of from 2.01 to 2.5 methyl and chlorophenyl groups per silicon atom, from 1 to 7 percent of the methyl and tetrachlorophenyl groups being chlorophenyl groups, with there being an average of from 3 to 5 chlorine atoms attached to each phenyl group (2) heating the resulting mixture to a temperature of from 225 to 300° C. (3) bubbling an oxygen containing gas through the product of (2), (4) cooling the product of (3) to a lower temperature, and (5) filtering precipitated solids from the product of (4).

3. The product formed by the process of claim 1.

4. The product formed by the process of claim 2.

5. A stabilized lower alkylchlorophenylpolysiloxane fluid containing from 0.5 to 10 parts, by weight, of the product of claim 3 per 100 parts of said fluid, said lower alkylchlorophenylpolysiloxane fluid having a viscosity of from about 10 to 100,000 centistokes when measured at 25° C. and containing an average of from 2.01 to 2.5 lower alkyl and chlorophenyl groups per silicon atom, from 1 to 7 percent of the lower alkyl and chlorophenyl groups being chlorophenyl groups, with there being an average of from 3 to 5 chlorine atoms attached to each phenyl group.

6. A stabilized methylchlorophenylpolysiloxane fluid containing from .05 to 10 parts by weight per 100 parts of the product of claim 4, said methylchlorophenylpolysiloxane fluid having a viscosity of from about 10 to 100,000 centistokes when measured at 25° C. and containing an average of from 2.01 to 2.5 methyl and chlorophenyl groups per silicon atom, from 1 to 7 percent of the methyl and chlorophenyl groups being chlorophenyl groups, with there being an average of from 3 to 5 chlorine atoms attached to each phenyl group.

References Cited in the file of this patent

UNITED STATES PATENTS 2,445,567     Elliott _____ July 20, 1948